May 25, 1965 R. H. BOLL ETAL 3,185,457
METHOD OF AND APPARATUS FOR HEATING FLUIDS
Filed March 9, 1961 2 Sheets-Sheet 1

INVENTORS
Richard H. Boll
Edward A. Pirsh

BY 
ATTORNEY

3,185,457
Patented May 25, 1965

3,185,457
METHOD OF AND APPARATUS FOR HEATING FLUIDS
Richard H. Boll, Alliance, and Edward A. Pirsh, Akron, Ohio, assignors to The Babcock & Wilcox Company, New York, N.Y., a corporation of New Jersey
Filed Mar. 9, 1961, Ser. No. 94,605
5 Claims. (Cl. 263—19)

The present invention relates to a method of and apparatus for heating a gaseous fluid to high temperature, and more particularly to the heating of gas or air by the use of an inert solid heat transfer material which is converted to the molten form by heating predominantly in suspension, reconverted to the solid form in giving up its heat to the gas or air being heated, and thereafter recycled for reuse as a heat transfer media.

The need for high temperature air heaters is becoming more and more pressing particularly when temperatures of from 2000° F. to 4000° F. may be required in order to achieve combustion temperatures in the range from 3500° F. to 5500° F. No structural materials are now known which will simultaneously withstand such temperatures and resist attack by the ash constituents and oxygen in the hot gases. Non-oxide materials, such as tungsten, graphite, silicon carbide and boron nitride, will withstand the temperatures, but will also oxidize rapidly in contact with air or even combustion gases. Oxides, such as zirconia, magnesia, and beryllia will withstand the temperatures and resist attack by oxygen, but they are subject to severe fluxing attack by the ash constituents of coal and residual fuel oil. In fact, even small quantities of dust entrained in air used for combustion of a relatively clean fuel will tend to flux the known refractory materials otherwise usable at extremely high temperatures, and so lead to their early failure.

In the present invention, a relatively inert heat transfer medium is used in both solid and liquid form. In its liquid form, it is capable of transmitting absorbed heat; in its solid form it may be used to line and thereby protect the confining walls of the material flow passageways. The heat transfer material may, for example, take the form of the non-combustible ash content of a solid fuel. The slag residue of such solid fuel is ordinarily molten and flowable at temperatures above about 2300° F. to 2700° F. and is transportable in a molten form. The maximum temperature to which the molten slag must be heated in any given application depends upon the desired temperature of the air or gas to be heated, heat losses in the apparatus, and the like. The maximum temperature to which a specific slag may be heated without encountering excessive evaporation depends upon the slag composition. In most cases, the maximum allowable temperature will exceed the desired temperature for air or gas heating, but in those few cases where it does not, resort may be made to modification of the slag composition through additions of refractory oxides. Thus, when using molten slag as a heat transfer medium, the slag stream may be gravitationally passed through a contact tower for direct heat interchange with the gas or air to be heated. The heat interchange solidifies the slag while heating the gas or air so that the slag may be removed from the heater in a granular solid form and be recirculated to the slag melting vessel for reuse in the heat interchange process. In this invention, the granular slag is heated predominantly in falling suspension by countercurrent contact with hot gases which may originate from any source. The flow path of the molten slag from the slag melting vessel to the air heater may be arranged to form a gas seal therebetween which will be effective for a range of differential pressures extending from a few inches of water pressure to 10 atmospheres and greater.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of the invention.

Figure 1:
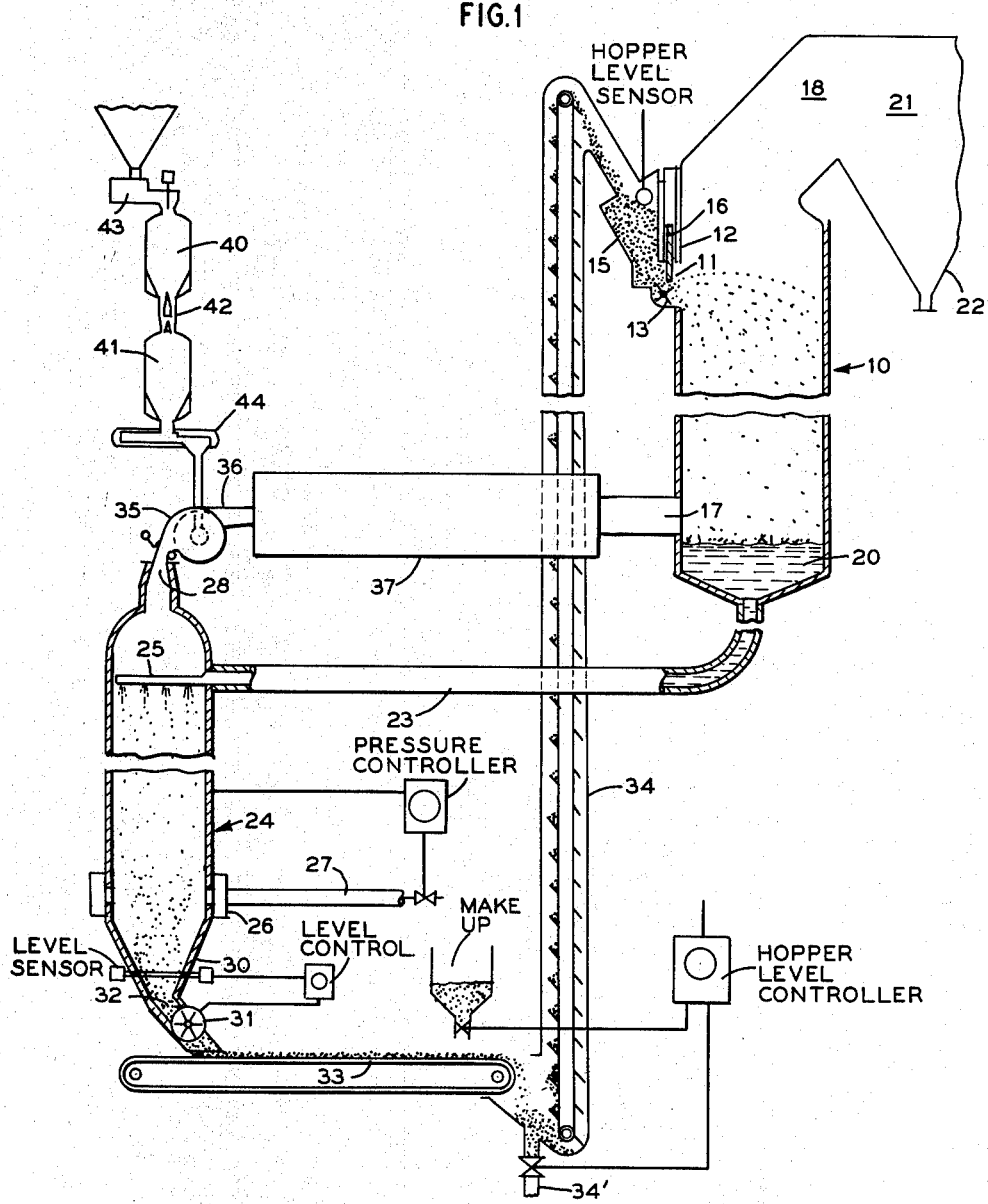
FIG. 1 is a diagrammatic sectional elevation of a slag-air heater applied to a magnetohydrodynamic generator and constructed in accordance with the present invention.

As shown in FIG. 1, the heat exchanger of the present invention is illustrated in apparatus for burning a solid ash containing fuel. As shown, the hot products of combustion produced in a furnace may be passed through, for example, a magnetohydrodynamic generator for the production of electric energy. In such service, the hot products of combustion, with or without a seeding material, such as potassium, may attain a temperature of 5000 F. to 6000 F. or higher, and be passed into the generator at superatmospheric pressures. In such a unit, the gases will leave the generator still at high temperature such as 3500–4500 F. but at substantially atmospheric pressure and may be used for melting slag in the slag melting chamber of the invention.

It will be understood that the heat exchanger of the present invention may also be used to heat gaseous fluid to higher or lower temperatures than would be prevalent in a magnetohydrodynamic generator. However, in the invention, high temperature gases must be delivered to the slag melting chamber or vessel so as to convert the solid slag particles into a molten form. It will also be understood that the heater of the present invention may be used in the combustion of substantially ash-free fuels where the heat exchange media, i.e., slag, will be obtained from a separate source, and recycled through the gaseous fluid heating system.

As shown in FIG. 1, the granular slag is introduced into the upper portion of an upwardly elongated slag melting furnace or chamber 10 through an opening 11 in a wall 12 of the chamber. A suitable granular slag feeder, such as a spoked wheel 13, is positioned adjacent the opening 11 to project the granular slag transversely across the furnace. The granular slag is accumulated in a surge bin 15, with the rate of flow therefrom to the wheel 13 regulated by the rotation rate of the wheel in coordination with a gate 16, where the gate is vertically adjustable in relationship to the wheel. The surge bin serves as a seal to avoid flow of low pressure gases through the opening 11 from the furnace 10.

The gravitational movement of the granular slag is countercurrent to hot gases which are passed upwardly through the furnace from a lower gas inlet 17 toward an upper gas outlet 18. The hot gases must necessarily be at a temperature in excess of the melting temperature of the slag and will melt the slag particles in suspension to form and maintain a molten pool 20 of slag in the lower portion of the furnace 10. The gases leaving the furnace outlet 18 may be passed through dust separating devices such as a baffled flow path 21 having a lower dust collecting hopper 22, and thereafter pass through heat recovery devices such as a boiler (not shown), or the like.

The molten slag maintained in the pool 20 in the lower portion of the furnace passes by gravity through a connecting conduit 23 to an air or gas heater, or heating tower 24 positioned at a lower elevation. The conduit 23 is constructed of sufficient length, and the vertical spacing between the chamber 10 and heater 24 is such as to provide a head of molten slag adequate to form a seal against leakage of gas or air therethrough and to cause a flow of molten slag by gravity. Alternatively, in order to effect the flow of molten slag, conduit 23 may be fitted with an electromagnetic pump (not shown) so as to decrease the vertical separation needed between heater 24 and chamber 10 and thereby decrease the length of conduit 23 and the magnitude of associated heat losses. Such an electromagnetic pump may also serve as either a pump or a brake for flow control purposes. When, as shown in FIG. 1, the slag-air heater is utilized to preheat air for fuel combustion, the pressure in the upper portion of the heater 24 may be of the order of 10 atmospheres or more. In the same arrangement, the pressure in the chamber 10 may be only slightly over that of the atmosphere so that the slag head must form a seal for differential pressure of the order of 150 p.s.i. In other applications of the slag-air heater of this invention, the differential pressure between the chamber 10 and the heater 24 may be less than one pound per square inch (p.s.i.), as hereinafter described in connection with FIG. 2, and the use of a connection, such as conduit 23, may be omitted.

The molten slag is injected into the upper portion of the tower through a suitable distributor 25 so that the slag will move downwardly by gravity in the form of droplets or globules of generally uniform size and will be solidified by a rising stream of relatively cool air or gas entering through an inlet 26. The air or gas to be heated may be compressed to a pressure as required for its end use and to overcome the pressure drop of flow through the tower 24, passed through a conduit 27 to the opening 26, and after being heated is discharged through a hot gas outlet 28 in the top of the tower 24. The tower 24 is of sufficient height to cause the slag droplets to solidify after being introduced through the distributor 25 so that the solidified granular slag particles may be collected in the hopper 30 at the bottom of the tower. As shown in the drawing, the heating tower 24 is provided with a star type feeder 31 or the like at the outlet 32 from the hopper 30 so as to form an air lock and to thereby avoid loss of high temperature air or gas through the slag outlet.

In moving downwardly through the tower 24, in countercurrent intimate relationship with the rising air or gas, the droplets or globules of slag are solidified so that the ash collected in the bottom of the tower will be in a granular solid form. For best operation, the slag contacting the rising air streams should be in droplet form of a generally uniform size, with the resulting solid granular solids collecting in the bottom of the heater also being of a generally uniform size. The slag droplet size is coordinated with the flow velocity of the air or gas rising through and the height of the heater 24 so as to provide a desired contact relationship therebetween to solidify the slag during its air or gas suspension and thereby avoid agglomeration of the particles in the bottom of the heater. While some of the finer droplets of molten slag may be entrained with the heated gases leaving the outlet 28, the quantity is minor and after forming a frozen protective layer on the confining walls the excess will flow downwardly in granular form into the lower portion of the heater. The granular slag is cooled to a temperature of the order of 800° F. and returned to the furnace 10 by means of a conveyor 33 and a conventional elevator 34, or by any other convenient means.

Control of the apparatus is achieved primarily through control of the rate of injection of solid slag into the furnace 10. This is accomplished by adjusting the rate of rotation of spoked wheel 13 in conjunction with the position of gate 11. If, for example, it is desired to decrease the temperature of the molten slag in the pool 20, the rate of solid slag injection is increased so that the ratio of slag weight to gas weight of falling slag in furnace 10 exchanges heat with a smaller quantity of hot gas, and so arrives at the pool 20 at a lower temperature. This increased rate of slag flow into the pool 20 raises the level of this pool and causes a corresponding increase in molten slag flow through the pipe 23, and the spraying apparatus 25, the flow characteristics of the spraying device and the pipe being designed to produce a particular slag flow rate at the nominal operating pressure of chamber 24 for a nominal liquid level in the bottom of furnace 10. The pressure in chamber 24 is controlled at or near its nominal value by the combined operation of a pressure sensing element, controller, and valve in the inlet air or gas stream 27 operating in conjunction with the flow characteristics of the process receiving the hot air or gas from outlet 28, e.g., furnace 35 and magnetohydrodynamic generator 37.

The level of granular slag in the hopper 30 of chamber 24 is controlled to its appropriate level through the combined action of the level sensor controller, and the drive mechanism of the star feeder 31. Similarly, the level in hopper 15 is controlled through the combined action of the level sensor, controller, slag withdrawal valve 34', and slag make-up valve. Alternatively, we may provide a wider allowable pressure range in chamber 24, or a lesser vertical length of pipe 23, or both by installing in pipe 23 an electromagnetic pump with controllable characteristics. Control arrangements in this case will readily be envisioned by those skilled in the art.

The gas or air heated in the tower 24 will discharge through outlet 28 and be directed to its point of use. In the illustrated example, the heated air is delivered to a cyclonic type of furnace 35 where the preheated air aids in the combustion of a solid ash-containing fuel also delivered to the furnace. The furnace 35 may be of the type shown in U.S. Patent 2,357,301, or it may be of a type wherein all of the products of combustion pass through a tangential outlet 36 from one end of the furnace into, for example, a magnetohydrodynamic generator 37 such as shown in U.S. Patent 1,509,103. In the furnace 35 shown, the products of combustion from the furnace not only include hot gases but will also include vaporized and molten slag particles entrained in the gases.

When the invention is applied for the generation of magnetohydrodynamic electric power, the products of combustion are discharged from the furnace 35 at a high pressure, such as, for example, 10 atmospheres. Under these conditions, the fuel delivered to the furnace will be passed through lock hoppers 40 and 41 so that the fuel may be delivered to the furnace 35 without the loss of furnace pressure. A simple lock hopper arrangement is illustrated in the drawings wherein a pair of superposed hoppers 40 and 41 are interconnected by a suitable conduit 42 with solid material feeders 43 and 44 connected with both the upper inlet of the uppermost hopper 40 and the bottom outlet of the lowermost hopper 41. With such an arrangement, the flow of solid fuel may be regulated while maintaining superatmospheric pressure in the furnace 35.

When temperatures in excess of 3000 F. are encountered, the materials of wall construction become critical. In fact, when temperatures such as required for a magnetohydrodynamic generator are required, no known materials are economically feasible. In the present invention, we provide wall structures for certain portions of the slag air heater, exposed to high temperatures, which consist of fluid cooled metallic walls. For the most part, these walls are protected from erosion, corrosion, and excessive heat transfer rates by layers of solidified slag frozen thereon. In the construction described, cooling fluid flow through the wall will maintain a temperature gradient between the cooling fluid and the hot face of the wall so that a layer of slag will generally freeze thereon. The thickness of the frozen slag layer will be dependent upon the temperature of the gases or slag in contact therewith. It will be understood by those skilled in the art that the thickness of frozen slag contacting the hot face of the wall will not be sharply defined since a superposed film of relatively viscous slag will merge with the frozen slag to aid in protecting the hot face of the metallic wall portion. With a protective film of frozen slag on the hot face of the metallic wall, the wall will not be subject to erosion, corrosion or excessive heat transfer from the hot gases or molten slag confined by the wall.

Figure 3:
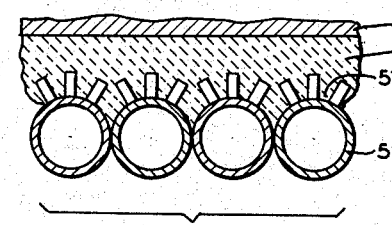
FIG. 3 is a fragmentary showing of the wall structure used to confine the molten slag in the apparatus of FIGS. 1 and 2.

The wall construction described is illustrated in FIG. 3, where a wall section 50 is provided with a plurality of cooling fluid flow passages or tubes 51. The tubes 51 are positioned in tangent relationship, studded and initially coated by a layer of initially plastic refractory material. In service, the refractory material will be replaced by a layer of frozen slag 52, a layer of plastic slag 53, and a layer of molten slag 54. The line of demarkation between the frozen and plastic slag will be indefinite, but the semi-frozen or plastic slag layer 53 will aid in protecting the wall 50. The wall structure shown in FIG. 3 will be used to protect the surfaces of chamber 10, chamber 24, duct 28, and spraying device 25 which are exposed to high temperatures.

Depending upon the temperature and nature of the slag, particularly its heat transfer characteristics, pipe 23 and spraying device 25 may or may not employ a frozen slag layer as described above for protection against the flow of molten slag which they carry. In cases where the frozen slag layer is impractical because of excessive heat transfer rates or excessive heat losses, these devices may be lined with a refractory material such as graphite, silicon carbide, boron nitride, or the like, there being no problem of oxidation since the refractory material is always exposed only to molten slag and not to combustion gas or air.

With the construction and arrangement described, gas temperatures as high as 5000 F. may be handled entering from conduit 17 and air temperatures in the range of 2500 F. to 4000 F. may be attained at the heating chamber outlet 28 even though slag and slag constituents may be present in molten or vapor form in the gases entering through conduit 17.

Figure 2:
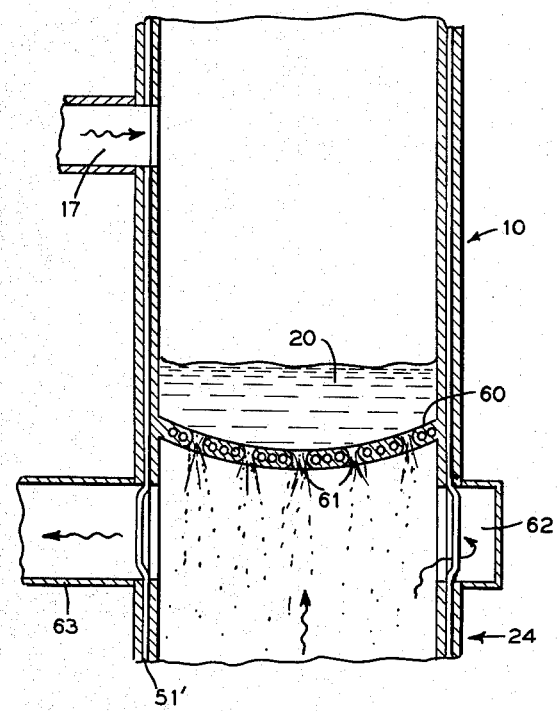
FIG. 2 is a diagrammatic sectional elevation of a modification in the slag-air heater of FIG. 1.

In the modified form of the invention shown in FIG. 2, the slag heating chamber 10 is superimposed on the air or gas heater 24. This construction will be used when the differential pressure between the heating gas in chamber 10 and the gas to be heated in heater 24 is considerably less than that described in connection with the arrangement of FIG. 1. As shown in FIG. 2, the slag granules raining downwardly through the chamber 10 are heated by the hot gases entering the inlet 17 and are in a molten state when they enter the pool 20. The molten slag pool is supported upon a partition 60 which is fluid cooled and is perforated as at 61 to permit movement of a plurality of streams of molten slag downwardly into the upper portion of the heater 24. As described in connection with FIG. 1, the air or gas to be heated is passed upwardly through the heater 24 in direct countercurrent contact with the slag droplets which are solidified thereby. The heated air or gas leaves the heater 24 through a collecting manifold 62 positioned in the upper portion thereof, with the hot gas or air discharged through conduit 63 to point or points of use. The walls of both the chamber 10 and heater 24 are provided with rows of fluid cooled tubes 51' which are vertically arranged in the modification shown in FIG. 2, but could be arranged in horizontal planes or in spiral form, as desired.

Although we have described this invention with particular reference to its combination with a magnetohydrodynamic generator, it will readily be understood that it may also be used for heating air or gas to temperatures in the range from 2000 F. to 4000 F. in combination with other processes requiring such air or gas temperatures. Similarly, although we have shown the gas used for melting the slag to be the exhaust gas from a magnetohydrodynamic generator, it will be appreciated that other sources of hot gas may also be used provided the temperature is sufficiently high to melt the slag and the quantity sufficiently large. It will also be appreciated that in special cases where the heating gas is free of ash or ash constituents, the slag may be replaced if desired, by pure metallic oxides or carbonates or their mixtures having melting points appropriate to the application.

While in accordance with the provisions of the statutes, we have illustrated and described herein the best form and mode of operation of the invention now known to us, those skilled in the art will understand that changes may be made in the form of the apparatus disclosed without departing from the spirit of the invention covered by our claims, and that certain features of our invention may sometimes be used to advantage without a corresponding use of other features.

What is claimed is:

1. The method of heating a gaseous fluid to a high temperature which comprises the steps of heating a granular solid while substantially in gaseous fluid suspension in a solids heating zone to a liquefied temperature, passing said liquefied solid to a separate gaseous fluid heating zone, introducing said liquefied solid into said gaseous fluid heating zone to heat said fluid and to solidify said liquefied solids to granular form while in gaseous fluid suspension, and recycling said granular soldis to said solids heating zone.

2. The method of burning fuel which comprises the steps of burning said fuel at high temperatures in a combustion zone, passing the hot products of combustion from said combustion zone and through a gas cooling zone, contacting said hot products of combustion within said gas cooling zone by a dispersed stream of solidified ash having a liquidus as temperature in excess of 2300° F. to cool the gases and to liquefy said ash substantially while in gaseous suspension, passing said liquefied ash to a separate air heating zone, introducing said liquefied ash into said air heating zone in direct countercurrent contact with air to solidify said ash in particle form and to heat said air, passing said heated air to said combustion zone to aid in burning said fuel at a high temperature, and recycling said solidified ash to said gas cooling zone.

3. The method of burning an ash-containing fuel which comprises the steps of burning said fuel at high temperatures in a combustion zone with the non-combustible ash constituents of said fuel being in molten and vapor form, passing the hot products of combustion including said non-combustibles from said combustion zone through a gas cooling zone, contacting said hot products of combustion within said gas cooling zone by a dispersed stream of solidified particle-form ash to liquefy the ash and to cool the gases, passing said liquefied ash to a separate combustion air heating zone, discharging said liquefied ash into said combustion air heating zone in droplet form for direct countercurrent contact with a stream of air to solidify said droplets of ash and to heat said air, returning said solidified droplets of ash to said gas cooling zone, regulating the quantity of solidified droplets of ash delivered to said gas cooling zone, and passing the heated combustion air to said combustion zone.

4. The method of burning an ash-containing fuel which comprises the steps of burning said fuel at high temperatures in a combustion zone with the non-combustible ash constituents of said fuel being in molten and vapor form, passing the hot products of combustion including said non-combustibles from said combustion zone and through a gas cooling zone, contacting said hot products of combustion within said gas cooling zone by a dispersed stream of solidified particle-form ash to liquefy said ash and to cool the gases below the condensation temperature of said vapor form non-combustible ash constituents passing said liquefied ash to a separate combustion air heating zone, discharging said liquefied ash into said combustion air heating zone to form droplets for direct countercurrent contact with a stream of air to solidify said droplets of ash and to heat said air, returning said solidified droplets of ash to said gas cooling zone, passing the heated combustion air to said combustion zone, and controlling the flow of liquefied ash from said gas cooling zone by regulating the rate of delivery of said solidified particle-form ash thereto.

5. The combination with a furnace for the high temperature combustion of fuel and a magnetohydrodynamic generator arranged to receive high temperature gases from said furnace, of a heat exchange apparatus comprising fluid cooled walls defined a chamber, means for passing hot gaseous fluid from said generator upwardly through said chamber, means including a feeder for injecting a granular solid material into the upper portion of said chamber, said material being liquefied by direct contact with said hot gaseous fluid and deposited in a liquid pool of said material maintained in the lower portion of said chamber, fluid cooled walls defining a separate heater, means for passing air to be heated upwardly through said heater and thence to said furnace, means for the introduction of liquefied solids from said chamber into said heater, said liquefied solids being solidified into granular solid form in passage downwardly through said heater, and means for withdrawing said granular solid material from the lower portion of said heater and delivering the material to said feeder.

References Cited by the Examiner
UNITED STATES PATENTS

| 2,631,835 | 3/53 | Jones | 263—19 |
| 2,636,723 | 4/53 | Harter et al. | 263—19 |
| 2,688,046 | 8/54 | Norton et al. | 263—52 X |

OTHER REFERENCES

Pages 44–49 of "Combustion" Magazine of October 1961; vol. 33, No. 4.

CHARLES SUKALO, *Primary Examiner.*

FREDERICK L. MATTESON, JR., PERCY L. PATRICK, *Examiners.*